(12) United States Patent
Shatsky et al.

(10) Patent No.: US 11,868,248 B2
(45) Date of Patent: Jan. 9, 2024

(54) OPTIMIZATION FOR GARBAGE COLLECTION IN A STORAGE SYSTEM

(71) Applicant: Dell Products L.P., Round Rock, TX (US)

(72) Inventors: Yosef Shatsky, Karnei Shomron (IL); Doron Tal, Geva Carmel (IL)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 17/681,449

(22) Filed: Feb. 25, 2022

(65) Prior Publication Data

US 2023/0273877 A1    Aug. 31, 2023

(51) Int. Cl.
*G06F 12/02*   (2006.01)
*G06F 3/06*    (2006.01)

(52) U.S. Cl.
CPC ........ *G06F 12/0253* (2013.01); *G06F 3/0604* (2013.01); *G06F 3/0638* (2013.01); *G06F 3/0689* (2013.01); *G06F 2212/7205* (2013.01)

(58) Field of Classification Search
None
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |
| 9,372,751 B2 | 6/2016 | McNutt |

(Continued)

FOREIGN PATENT DOCUMENTS

WO         2015108670 A1    7/2015
WO PCT/US2019/024885       1/2020

(Continued)

OTHER PUBLICATIONS

Dell EMC, "Dell EMC VxRack FLEX," Dell EMC Product Overview, 2018, 5 pages.

(Continued)

*Primary Examiner* — Charles J Choi
(74) *Attorney, Agent, or Firm* — Ryan, Mason & Lewis, LLP

(57) ABSTRACT

A garbage collection process is performed in a storage system which comprises a storage control node, and storage nodes which implement a striped volume comprising a plurality of stripes having strips that are distributed over the storage nodes. The storage control node selects a victim stripe for garbage collection, and an empty stripe in the striped volume. The storage control node determines a data strip of the victim stripe having predominantly valid data based on a specified threshold, and sends a copy command to a target storage node which comprises the predominantly valid data strip, to cause the target storage node to copy the predominantly valid data strip to a data strip of the empty stripe which resides on the target storage node. The storage control node writes valid data blocks of the victim stripe to remaining data strips of the empty stripe, and releases the victim stripe for reuse.

20 Claims, 6 Drawing Sheets

(56) References Cited

U.S. PATENT DOCUMENTS

| | | | |
|---|---|---|---|
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 11,221,975 | B2 | 1/2022 | Puder et al. |
| 11,262,933 | B2 | 3/2022 | Matosevich et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2016/0179422 | A1* | 6/2016 | Lee .................. G06F 11/10 711/114 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2022/0004320 | A1 | 1/2022 | Matosevich et al. |
| 2022/0035788 | A1 | 2/2022 | Aharoni et al. |
| 2022/0413762 | A1* | 12/2022 | Pletka .................. G06F 3/0656 |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex," Version 3.5.x, Rev. 02, Jan. 2021, 66 pages.

U.S. Appl. No. 17/065,754 filed in the name of Dan Aharoni et al. dated Oct. 8, 2020, and entitled "Direct Response to IO Request in Storage System with Remote Replication.".

U.S. Appl. No. 17/070,288 filed in the name of Anurag Sharma et al. dated Oct. 14, 2020, and entitled "Pipeline-Based System for Configuration Checking and Reporting Associated with an Information Processing System.".

U.S. Appl. No. 17/070,073 filed in the name of Dan Aharoni et al. dated Oct. 14, 2020, and entitled "Direct Response to IO Request in Storage System Having an Intermediary Target Apparatus.".

U.S. Appl. No. 17/071,407 filed in the name of John Moran et al. dated Oct. 15, 2020, and entitled "Dynamic Remediation Actions in Response to Configuration Checks in an Information Processing System.".

U.S. Appl. No. 17/077,105 filed in the name of Yosef Shatsky et al. dated Oct. 22, 2020, and entitled "Volume Tiering in Storage Systems.".

U.S. Appl. No. 17/106,988 filed in the name of Rivka Matosevich et al. dated Nov. 30, 2020, and entitled "Managing Host Connectivity to a Data Storage System.".

U.S. Appl. No. 17/123,525 filed in the name of Itay Keller et al. dated Dec. 16, 2020, and entitled "Deferred Reclamation of Invalidated Entries Associated with Replication in a Log-Structured Array.".

U.S. Appl. No. 17/145,646 filed in the name of Yosef Shatsky et al. dated Jan. 11, 2021, and entitled "Redistribution of Processing Groups between Server Nodes Based on Hardware Resource Utilization.".

U.S. Appl. No. 17/232,203 filed in the name of Roman Spiegelman dated Apr. 16, 2021, and entitled "Object Synchronization of Server Nodes in a Network Computing Environment.".

U.S. Appl. No. 17/236,256 filed in the name of Doron Tal et al. dated Apr. 21, 2021, and entitled "Recovery from Partial Device Error in Data Storage System.".

U.S. Appl. No. 17/306,601 filed in the name of Rivka Matosevich et al. dated May 3, 2021, and entitled "Managing Replication Journal in a Distributed Replication System.".

U.S. Appl. No. 17/308,166 filed in the name of Adi Bar Shalom et al. dated May 5, 2021, and entitled "Journal Barrier Consistency Determination."

U.S. Appl. No. 17/351,733 filed in the name of Yosef Shatsky et al. dated Jun. 18, 2021, and entitled "Data Deduplication in a Disaggregated Storage System."

U.S. Appl. No. 17/361,666 filed in the name of Yosef Shatsky et al. dated Jun. 29, 2021, and entitled "Tracking Utilization of Data Blocks in a Storage System."

U.S. Appl. No. 17/511,695 filed in the name of Yosef Shatsky et al. dated Oct. 27, 2021, and entitled "Write Cache Management."

U.S. Appl. No. 17/511,699 filed in the name of Yosef Shatsky et al. dated Oct. 27, 2021, and entitled "Metadata Management in Storage Systems."

U.S. Appl. No. 17/512,890 filed in the name of Yosef Shatsky et al. dated Oct. 28, 2021, and entitled "Utilizing Checkpoints for Resiliency of Metadata in Storage Systems."

U.S. Appl. No. 17/569,198 filed in the name of Yosef Shatsky dated Jan. 5, 2022, and entitled "Utilizing a Persistent Write Cache as a Redo Log."

(56) References Cited

OTHER PUBLICATIONS

U.S. Appl. No. 17/583,365 filed in the name of Doron Tal et al. dated Jan. 25, 2022, and entitled "Data Deduplication in a Storage System."

U.S. Appl. No. 17/583,787 filed in the name of Michal Yarimi et al. dated Jan. 25, 2022, and entitled "Intelligent Defragmentation in a Storage System."

* cited by examiner

100

400

OPTIMIZATION FOR GARBAGE COLLECTION IN A STORAGE SYSTEM

TECHNICAL FIELD

This disclosure relates generally to data storage management techniques and, more particularly, to techniques for implementing garbage collection in a storage system.

BACKGROUND

Distributed storage systems are implemented using a plurality of storage devices (e.g., storage arrays) which can reside on multiple storage nodes that are networked connected via a storage fabric. Various techniques are utilized in distributed data storage systems to provide resiliency and error correction to protect stored data in the event of failures of storage devices or storage nodes. For example, such techniques include erasure coding techniques and RAID (Redundant Array of Independent Drives) techniques. In general, RAID is a technology that is utilized to enhance the performance and reliability of data storage. There are various RAID levels which implement different combinations of techniques such as data mirroring, data striping, parity, etc., to provide fault tolerance and allow missing data to be recovered or otherwise reconstructed in the event of a failure of a storage device or storage node.

Over time, a striped storage volume such as a striped RAID storage volume can become fragmented to a level which begins to have an adverse impact on performance of the storage system. To enhance the storage performance, a garbage collection process can be performed to defragment the striped volume and generate empty stripes. However, defragmenting a striped storage volume such as a parity-based RAID storage volume can result in degraded system performance given that defragmentation can be extremely input/output (I/O) intensive, especially in a shared storage system where a storage control node needs to allocate shared resources (e.g., CPU cache, I/O channels, controller activity, etc.) for recomputing parity information and handling the intensive I/O load generated as a result of the read and write operations needed to perform the defragmentation process. The higher the amount of valid data in a given stripe, the more work is needed to perform the garbage collection and stripe defragmentation process. This is further exacerbated in disaggregated storage architectures where the data is not local to the storage control node performing the garbage collection and stripe defragmentation process, wherein performing such process requires a significant amount of traffic over the storage network for reading and writing the data. In this regard, garbage collection should be implemented in a way that minimizes adverse impact on storage system performance.

SUMMARY

Exemplary embodiments of the disclosure include techniques for implementing garbage collection in a storage system. For example, an exemplary embodiment includes a garbage collection process that is performed in a data storage system which comprises a storage control node and a plurality of storage nodes. The storage nodes are configured to implement a striped volume comprising a plurality of stripes having strips that are distributed over the plurality of storage nodes. In performing the garbage collection process, the storage control node selects at least one stripe of the plurality of stripes of the striped volume, as a victim stripe for garbage collection, and selects at least one empty stripe of the striped storage volume. The storage control node determines a data strip of the victim stripe, which has predominantly valid data based on a specified threshold, and sends a copy command to a target storage node of the plurality of storage nodes, which comprises the data strip of the victim stripe which is determined to have predominantly valid data, to thereby cause the target storage node to copy the data strip with predominantly valid data to a data strip of the selected empty stripe which resides on the target storage node. The storage control node writes valid data blocks of the victim stripe to remaining data strips of the selected empty stripe to thereby generate a new stripe populated with valid data, and releases the victim stripe for reuse.

Other embodiments of the disclosure include, without limitation, systems and articles of manufacture comprising processor-readable storage media, which are configured to implement garbage collection in a storage system.

DETAILED DESCRIPTION

Exemplary embodiments of the disclosure will now be discussed in further detail with regard to systems and methods for performing garbage collection in a storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
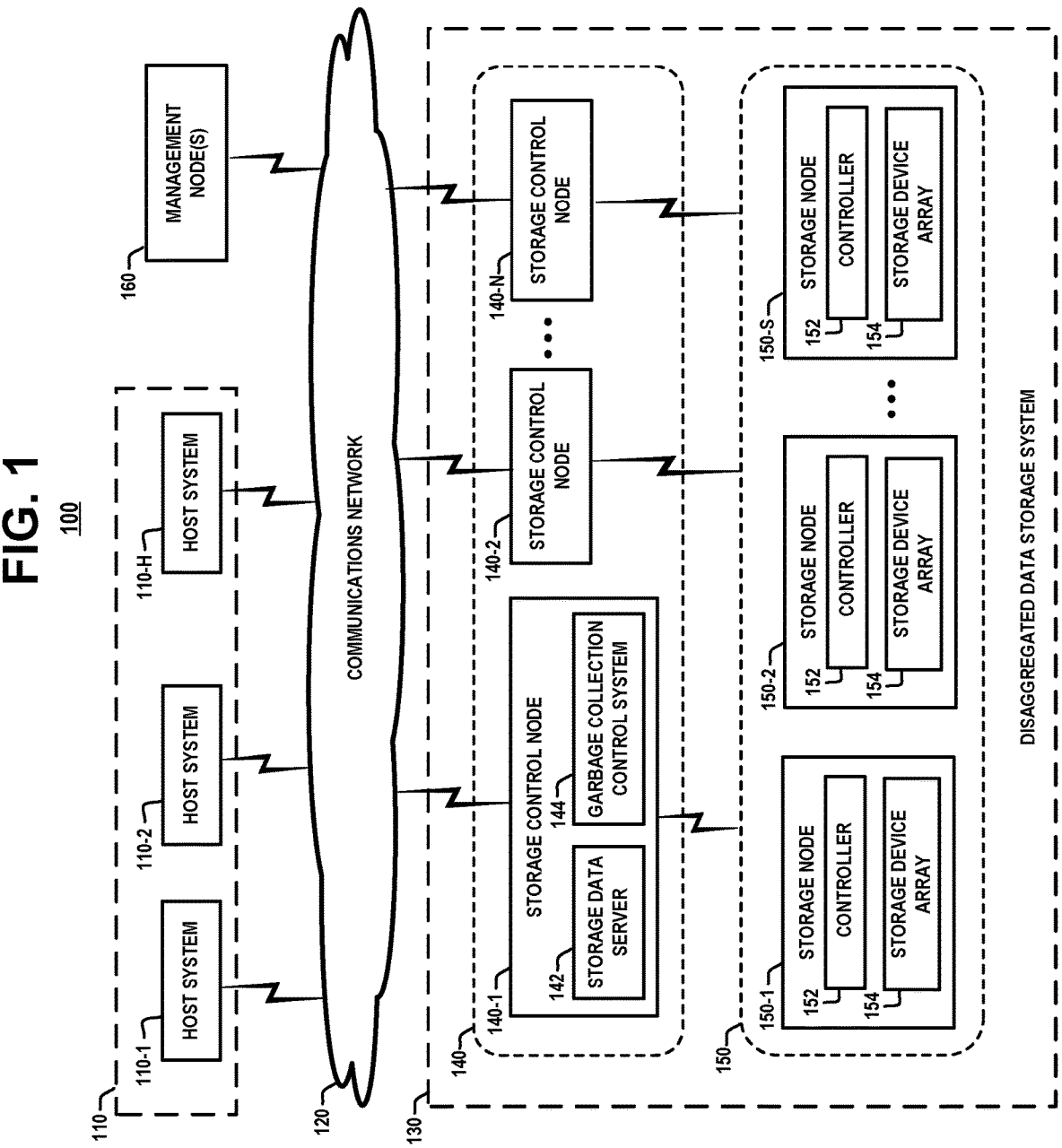
FIG. 1 schematically illustrates a network computing system comprising a storage system which implements a garbage collection control system, according to an exemplary embodiment of the disclosure.

FIG. 1 schematically illustrates a network computing system comprising a storage system which implements a garbage collection control system, according to an exemplary embodiment of the disclosure. In particular, FIG. 1 schematically illustrates a network computing system 100 which comprises one or more host systems 110-1, 110-2, . . . 110-H (collectively, host systems 110), a communications network 120, and a data storage system 130. The data storage system 130 comprises a plurality of storage control nodes 140-1, 140-2, . . . , 140-N (collectively, storage control nodes 140), and a plurality of storage nodes 150-1, 150-2, . . . , 150-S (collectively, storage nodes 150). As shown in FIG. 1, the storage control node 140-1 (or more generally, storage control system) comprises a storage data server 142, and a garbage collection control system 144. Further, in an exemplary embodiment, the other storage control nodes 140-2 . . . 140-N have the same or similar configuration as the storage control node 140-1 shown in FIG. 1. Each storage node 150-1, 150-2, . . . , 150-S comprises at least one device controller 152, and at least one storage device array 154.

The network computing system 100 further comprises one or more management nodes 160. In general, the management nodes 160 implement application programming interfaces (APIs) to enable manual, automated, and/or semi-automated configuration, management, provisioning, and monitoring of the data storage system 130 and the associated storage control nodes 140 and storage nodes 150. In some embodiments, the management nodes 160 comprise stand-alone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 150 and (ii) read requests to access data that is stored in one or more of the storage nodes 150. The storage control nodes 140 are configured to receive and process the data access requests and store/read data to/from the target storage nodes 150.

The communications network 120 is configured to enable communication between the host systems 110 and the data storage system 130, and between the management nodes 160, and the host systems 110 and the data storage system 130, as well as to enable peer-to-peer communication between the storage control nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage network fabric (e.g., Internet Protocol (IP)-based or Fibre Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. The storage control nodes 140 and the storage nodes 150 can be physical nodes, virtual nodes, and a combination of physical and virtual nodes.

For example, in some embodiments, each storage control node 140 comprises a server node that is implemented on, e.g., a physical server machine or storage appliance comprising hardware processors, system memory, and other hardware resources that execute software and firmware to implement the various storage control functions and data management functions as discussed herein. More specifically, in some embodiments, each storage control node 140 comprises a plurality of storage control processors which execute a lightweight operating system (e.g., a customized lightweight Linux kernel) and functional software (e.g., software-defined storage software) to implement various functions of the storage control node 140 which include, but are not limited to, (i) managing and executing data access requests issued by the host systems 110 for storing/reading data to/from the storage nodes 150, (ii) performing various data management and storage services, and (iii) controlling network communication and connectivity with the host systems 110 and between the storage control nodes 140 within the data storage system 130, etc.

In a distributed storage environment, the storage control nodes 140 are configured to communicate in a cooperative manner to perform functions such as e.g., processing data access requests received from the host systems 110, aggregating/pooling the storage capacity of the storage device arrays 154 of the storage nodes 150, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage device arrays 154 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, one or more of the storage device arrays 154 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in each storage node 150. In this regard, the term "storage device" as used herein should be broadly construed to encompass all types of persistent storage media including hybrid drives.

On each storage node, the device controller 152 is configured to perform data access operations to read/write data to/from the storage device array 154 in response to data access requests received from a storage control node 140. For example, in some embodiments, the device controller 152 comprises a flash memory controller which manages data stored on flash memory, an SSD controller which manages data stored on SSD device, or other types of device controllers which are configured to manage stored data depending on the type(s) of storage devices that are implemented by the storage device array 154. As explained in further detail below, the device controllers 152 are utilized during garbage collection operations to perform copy operations (e.g., copy-offload operations) that are offloaded to the device controllers 152 to copy and move data blocks (e.g., full data strips) in the storage device arrays 154 that are controlled by the respective device controllers 152.

In some embodiments, the data storage system 130 comprises a disaggregated data storage system in which data processing is separate from data storage. More specifically, the storage control nodes 140 are configured to handle the processing of data associated with data access requests (i.e., I/O read and write requests), and the storage nodes 150 are configured to handle writing/reading data to/from the respective storage device arrays 154. As noted above, the storage control nodes 140 and the storage nodes 150 can be physical nodes, virtual nodes, and a combination of physical and virtual nodes. The disaggregated data storage system 130 is configured to allow each storage control node 140-1, 140-2, . . . , 140-N to issue I/O requests directly to any one of the storage nodes 150-1, 150-2, . . . , 150-S (e.g., each storage control node 140-1, 140-2, . . . , 140-N can directly access data stored on any one of the storage nodes 150-1, 150-2, . . . , 150-S). The disaggregated storage system architecture essentially separates the storage control compute layers (e.g., storage control nodes 140) from the data storage layers (e.g., data storage nodes 150) which are managed within the same storage network fabric.

The data storage system 130 can be configured using known techniques to implement a disaggregated data storage system. For example, in some embodiments, the storage nodes 150-1, 150-2, . . . , 150-S can be external direct-attached storage (DAS) devices, wherein each storage node 150-1, 150-2, . . . , 150-S is connected to each storage control node 140-1, 140-2, . . . , 140-N using any suitable interface protocol such as Small Computer Systems Interface (SCSI), Fibre Channel (FC), etc. In other embodiments, the storage nodes 150-1, 150-2, . . . , 150-S can be network-connected to each of the storage control nodes 140-1, 140-2, . . . , 140-N (via a high-performance storage network fabric) using any suitable network configuration and network interface protocol such as Ethernet, FC, Internet Small Computer Systems Interface (iSCSI), InfiniBand, etc. For example, in some embodiments, the storage control nodes 140 and storage nodes 150 are interconnected in a full-mesh network, wherein back-end interconnectivity between the storage control nodes 140 and the storage nodes 150 is achieved using, e.g., a redundant high-speed storage fabric, wherein the storage control nodes 140 can utilize remote procedure calls (RPC) for control messages and remote direct memory access (RDMA) for moving data blocks.

In some embodiments, the storage data servers 142 of the storage control nodes 140 are configured to consolidate the capacity of the storage device arrays 154 (e.g., HDDs, SSDs, PCIe or NVMe flash cards, etc.) of the storage nodes 150 into storage pools from which logical volumes are allocated, wherein the logical volumes (e.g., a block unit of storage management) are identified by, e.g., logical unit numbers (LUNs). More specifically, the storage data servers 142 of the storage control nodes 140 are configured to create and manage storage pools (e.g., virtual pools of block storage) by aggregating storage capacity of the storage device arrays 154 of the storage nodes 150 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 142. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 142. The SDC provides the operating system or hypervisor (which runs the SDC) access to the logical block devices (e.g., volumes). Each SDC has knowledge of which storage data servers 142 hold (e.g., own) its block data, so multipathing can be accomplished natively through the SDCs.

As noted above, the management nodes 160 in FIG. 1 implement a management layer which manages and configures the network computing environment 100. In some embodiments, the management nodes 160 comprise a tightly-coupled cluster of manager nodes that are configured to supervise the operations of the storage cluster and manage storage cluster configurations. For example, management nodes 160 include metadata manager (MDM) modules that operate outside of the data path and provide the relevant information to the SDCs and the storage data servers 142 to allow such components to control data path operations. The MDM modules are configured to manage the mapping of SDCs to the storage data servers 142 of the storage control nodes 140. The MDM modules manage various types of metadata that are required to perform various management operations in the storage environment such as, e.g., managing configuration changes, managing the SDCs and storage data servers 142, maintaining and updating device mappings, maintaining management metadata for controlling data protection operations such as snapshots, replication, RAID configurations, etc., managing system capacity including device allocations and/or release of capacity, performing operations for recovering from errors and failures, and system rebuild tasks including rebalancing, etc.

The garbage collection control systems 144 of the storage control nodes 140 are configured to perform garbage collection/defragmentation operations to defragment user capacity of the storage device arrays 154 and reclaim storage capacity with stale data (e.g., invalid data bocks, deleted data block, etc.) to generate free storage capacity for reuse. In some embodiments, exemplary garbage collection control schemes will be discussed in the context of a RAID implementation of a storage system, wherein in some embodiments, the storage system comprises data organized in a log-structured array (LSA) architecture. In this regard, in some embodiments, some or all of the storage nodes 150-1, 150-2, . . . , 150-S are configured to implement a striped volume (e.g., RAID array) comprising a plurality of stripes having strips that are distributed over the plurality of storage nodes 150. Further, in some embodiments, the RAID array comprises a log-structured RAID array in which data is written in data strips in a log-structured format. In a log structure format, when stored data is updated, the stored (existing) data is not updated in place, rather, the updated data is written to a new location (out-of-place update) according to a log format, and the corresponding existing data is flagged as being "invalid." In this regard, a log-structured RAID control system is configured to write full stripes, thus avoiding the overhead associated with updating a RAID stripe in place.

When a stripe is initially written, the occupancy of newly written stripe will be 100% or substantially 100%. As the data of a given stripe is deleted or re-written to other locations via out-of-place writes, the given stripe becomes increasingly defragmented by virtue of having stale data, and can be selected by a given storage control node as a victim stripe for garbage collection. However, there can be a circumstance in which one or more data strips of the selected victim stripe have predominantly valid data. In such instances, exemplary embodiments of the disclosure provide an "optimized" garbage collection process that is implemented by a given storage control node (e.g., storage control node 140-1).

In particular, when the given storage control node determines that a data strip of a victim stripe has predominantly valid data, the storage control node will send a copy command to a target storage node (e.g., storage node 150-2) which comprises the predominantly valid data strip, to cause the target storage node to copy the predominantly valid data strip "as is" to a data strip of selected empty stripe, which resides on the target storage node. More specifically, the storage control node will instruct the device controller 152 of the target storage node to perform a local copy operation to store a copy of the predominantly valid data strip of the victim stripe to an offset location that corresponds to the data strip of the empty stripe which resides on the same storage device/storage node. This process essentially offloads the write process to the local device controller 152, and avoids the need for the storage control node to perform an I/O write operation over the storage network to write the predominantly valid data strip of the victim stripe to the new data strip of the empty stripe.

It is to be understood that the term "optimized" as used herein in conjunction with a garbage collection process refers to process of performing garbage collection process in which at least one predominantly valid data strip of a given victim stripe is copied "as is" to a new strip in another region on the same storage device/storage node as the predominantly valid strip of the victim stripe using a copy-offload operation. In this regard, the term "optimized" or "optimization" as used herein should not be construed as being limited to any particular absolute maximum or minimum performance with regard to garbage collection functions or storage system performance, etc. Exemplary garbage collection control schemes according to embodiments of the disclosure will now be discussed in further detail in conjunction with FIGS. 2-6.

Figure 2:
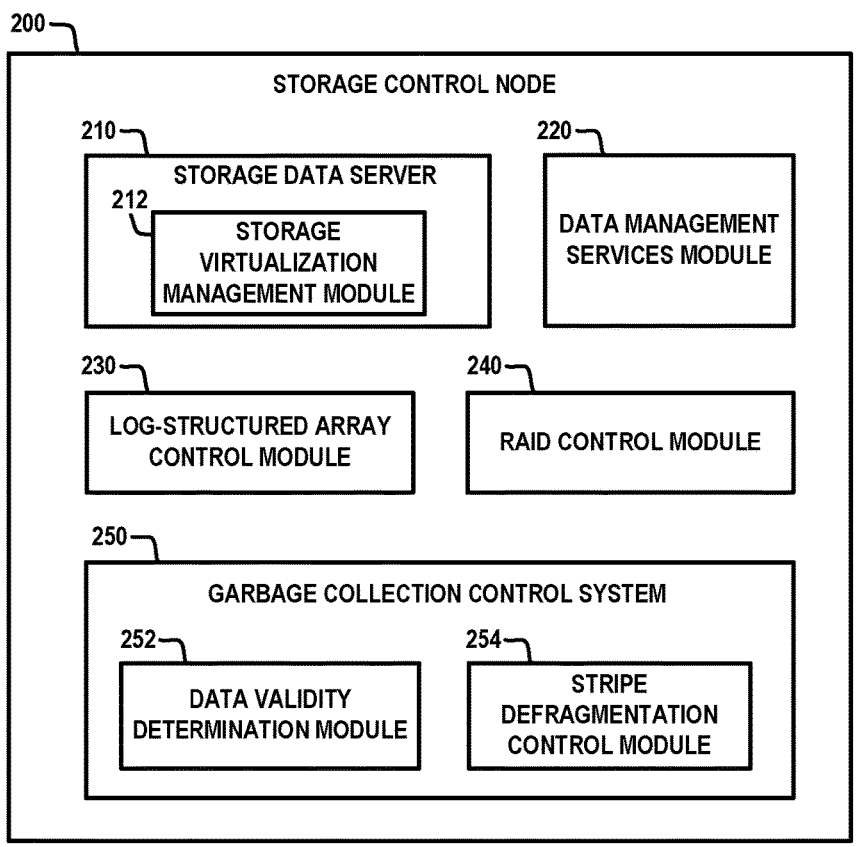
FIG. 2 schematically illustrates a storage control node which implements a garbage collection control system, according to an exemplary embodiment of the disclosure.

FIG. 2 schematically illustrates a storage control node which implements a garbage collection control system, according to an exemplary embodiment of the disclosure. In some embodiments, FIG. 2 schematically illustrates an exemplary architecture of the storage control nodes 140 of the data storage system 130 of FIG. 1. As shown in FIG. 2, the storage control node 200 comprises a storage data server 210, a data management services module 220, a log-structured array control module 230, a RAID control module 240, and a garbage collection control system 250. The storage data server 210 comprises a storage virtualization management module 212. The garbage collection control system 250 comprises a data validity determination module 252, and a stripe defragmentation control module 254, the functions of which will be described in further detail below.

The storage data server 210 implements functions as discussed above such as processing I/O write and read requests received from host systems to write/read data to/from target storage nodes 150. The storage virtualization management module 212 implements any suitable logical volume management system which is configured to create and manage local storage volumes by aggregating the capacity of the storage nodes 150 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The data management services module 220 implements one or more types of data management services including, but not limited to, inline data compression/decompression, data deduplication, data protection functions such as data replication, data backup, data snapshot, and other types of data management functions, depending on the system configuration.

Figure 3:
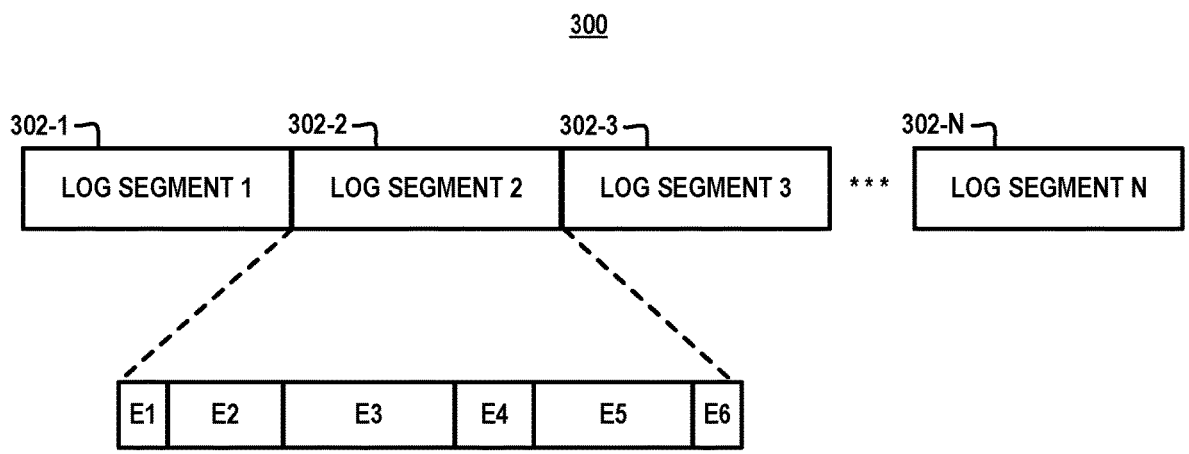
FIG. 3 schematically illustrates a log-structured array which can be generated and managed by the storage control node of FIG. 2, according to an exemplary embodiment of the disclosure.

In some embodiments, the LSA control module 230 is configured to create and manage the log-structured arrays within block storage capacity (e.g., volumes) of storage devices of the storage device arrays 154. More specifically, the LSA control module 230 is configured to organize portions of the block storage capacity of one or more of the storage pools/volumes of the storage devices into a LSA architecture in which data is stored (in compressed form and/or non-compressed form) in log segments of log-structured arrays according to an LSA data placement scheme. For example, FIG. 3 schematically illustrates a log-structured array 300 which can be generated and managed by the storage control node of FIG. 2, according to an exemplary embodiment of the disclosure. The log-structured array 300 comprises an array of N log segments 302-1, 302-2, 302-3, . . . , 302-N (collectively, or individually referred to as log segments 302). In some embodiments, the log-structured array 300 is allocated from block storage capacity of the storage devices. The block storage capacity of each storage device is divided into a plurality of logical data blocks (e.g., fixed-size allocation units), wherein each logical data block comprises a separately addressable unit of the physical storage space with a specified block size (e.g., allocation unit size). Each logical data block (e.g., allocation unit) comprises a same number of one or more physical data blocks of the underlying storage media.

More specifically, as is known in the art, the storage space of a storage device is organized into fixed-size addressable storage units (referred to as allocation units). The "allocation unit size" or "cluster size" of a given storage device is defined by the file system or operating system kernel when formatting the given storage device. An allocation unit represents the smallest logical block size of storage space that can be used to hold data and which is addressed as one logical unit by the operating system. Each logical block has the same "allocation unit size" which corresponds to a specific number of bytes of physical disk space. For example, for SSDs, the smallest addressable storage unit is a "page" wherein common page sizes are, e.g., 2 KB, 4 KB, 8 KB, or 16 KB. The pages of an SSD are aggregated into blocks, e.g., 128 or 256 pages per block. For HDDs, the smallest addressable storage unit is a "logical data block" which is uniquely addressed using a corresponding logical block address (LBA). In HDDs, a logical block size (e.g., 4 KB) can be equal to the physical sector size, or the logical block size can be a multiple of the physical sector size such that each logical block corresponds to a block of physical sectors. For example, for a physical sector size of 512 bytes, a logical block size can be 8×512 bytes=4096 bytes. In the LSA layout, each log segment 302 of the log-structured array 300 comprises a set of contiguous logical data blocks of the physical block storage space. In some embodiments, as explained in further detail below, the log segments 302 are distributed over multiple storage devices of different storage nodes according to a given RAID implementation. In some embodiments, the log segments 302 are equal in size (e.g., the log segments 302 each include the same number of logical data blocks). For example, assuming that each logical block of a given storage device (e.g., cluster of sectors on HDD, or page of SSD) is 4 KB, and that each log segment 302 has a segment size of 256 KB, then each of the N log segments 302 comprises a consecutive sequence of 64 logical data blocks within the LSA storage space.

Whenever a user-offset is written to a logical block address, the data is placed in a given log segment 302 which has enough vacancy to host the data. For example, when new data is written to LSA storage, the new data is appended to the end of a given log segment 302 which has sufficient space. In addition, metadata comprising log indexing information and other types of metadata are also appended to the given log segment 302 when data is written to the given log segment 302. In this regard, each log segment 302 will include a sequence of appended data entries comprising data items and metadata items. For example, as schematically illustrated in FIG. 3, the log segment 302-2 comprises log entries E1, E2, E3, E4, E5, and E6, wherein in some embodiments, each log entry comprises a data item and an associated metadata item. The log entries E1, E2, E3, E4, E5, and E6 are schematically illustrated in FIG. 3 as having different sizes, which is the result of data compression in an inline compression-enabled data storage system.

The LSA control module 230 implements various methods that are configured to generate and maintain log-structured arrays in block storage. For example, the LSA control module 230 is configured to generate log metadata which is included in metadata items that are appended to associated data items which are stored in the log segments of the log-structured arrays. The log metadata items within the log segment comprise indexing information (e.g., pointers) which is used to provide fast random access to data items within the log segments, as well as information that describes the data items (e.g., valid, not valid, compressed, uncompressed, etc.) within the log segment, and other information such as checksums for error detection, etc. The type of information and data structures that are used to implement the log metadata will vary depending on the application.

Furthermore, in some embodiments, the LSA control module 230 generates and maintains a log-structured array directory which stores mapping information that maps logical block addresses to physical block addresses of log entries within the log-structured arrays. In some embodiments, the directory information of the LSA directory is utilized to determine the location of a given log segment that holds the data of a given logical block, while the metadata indexing entries within the given log segment are utilized to determine the location of corresponding data items within the log segment.

In some embodiments, the LSA control module 230 implements a data placement scheme in which all I/O writes are appended to the end of a given log segment. In this regard, the physical location of data within log segments of the log-structured arrays will change over time as a result of out-of-place writes that are performed by the LSA data placement process, e.g., when writing modified blocks of compressed data to new log entries that are appended to the end of a given log segment. The out-of-place writes result in invalid blocks of data which cannot be reused until they are reclaimed. In addition, deletion operation cause data blocks within a given log segment to become invalid. As explained in further detail below, the garbage collection control system 230 periodically performs a defragmentation process to defragment a given log segment (e.g., data strip of a RAID stripe) having invalid log entries, by writing the valid log entries of the given log segment to a new log segment along with additional valid data to fill the new log segment.

The RAID control module 240 implements methods that are configured to distribute, organize, and manage data across multiple storage devices of different storage nodes to implement a RAID array according to a given RAID level configuration (e.g., RAID 5, RAID 6, etc.). The RAID control module 240 implements methods to perform functions such as striping, mirroring, parity computation, etc., to implement a RAID array depending on the given RAID level configuration. More specifically, the RAID control module 240 implements data striping methods that are configured to support RAID schemes which implement data striping techniques to distribute data over a plurality of storage devices. The data striping methods are configured to divide data into resiliency units called "stripes" wherein each stripe comprises a plurality of equal-sized data blocks, referred to as "strips." In some embodiments, the strips of a given stripe are stored on different storage devices of different storage nodes, which are provisioned to implement the RAID array.

In addition, the RAID control module 240 implements parity computing methods that are configured to support parity-based RAID schemes. The parity computing methods are configured to compute parity data (for, e.g., data stripes) using one or more types of parity functions (e.g., eXclusive OR (XOR) function, etc.). The types of parity functions that are implemented will depend on the RAID level configurations that are supported by the RAID control module 240. The RAID control module 240 implements methods for rebuilding of spare capacity in the event of one or more failures of a given RAID array, e.g., failure of a storage device within the given RAID array, or failure of a given storage node having a storage device that is implemented in the given RAID array, etc.).

In some embodiments, the RAID control module 240 is configured to implement different types of RAID levels (e.g., RAID 5, RAID 6, etc.) which utilize a combination of block level data striping and distributed parity techniques to provide resiliency and error correction in the event of a failure (e.g., failure of a given storage device within a RAID array, the failure of a storage node within the RAID array, etc.). In accordance with exemplary embodiments of the disclosure, the RAID control module 240 generates and manages one or more striped storage volumes (or striped logical volumes) that are associated with RAID configurations. It is to be understood that the term "stripe" as used herein refers to suitable type of storage unit, including, but not limited to, RAID stripes. In this regard, although exemplary embodiments are discussed herein in the context of RAID arrays and RAID stripes, it should be understood that the exemplary embodiments for defragmenting striped logical storage volumes is not limited to any specific type of storage technology.

Figure 4:
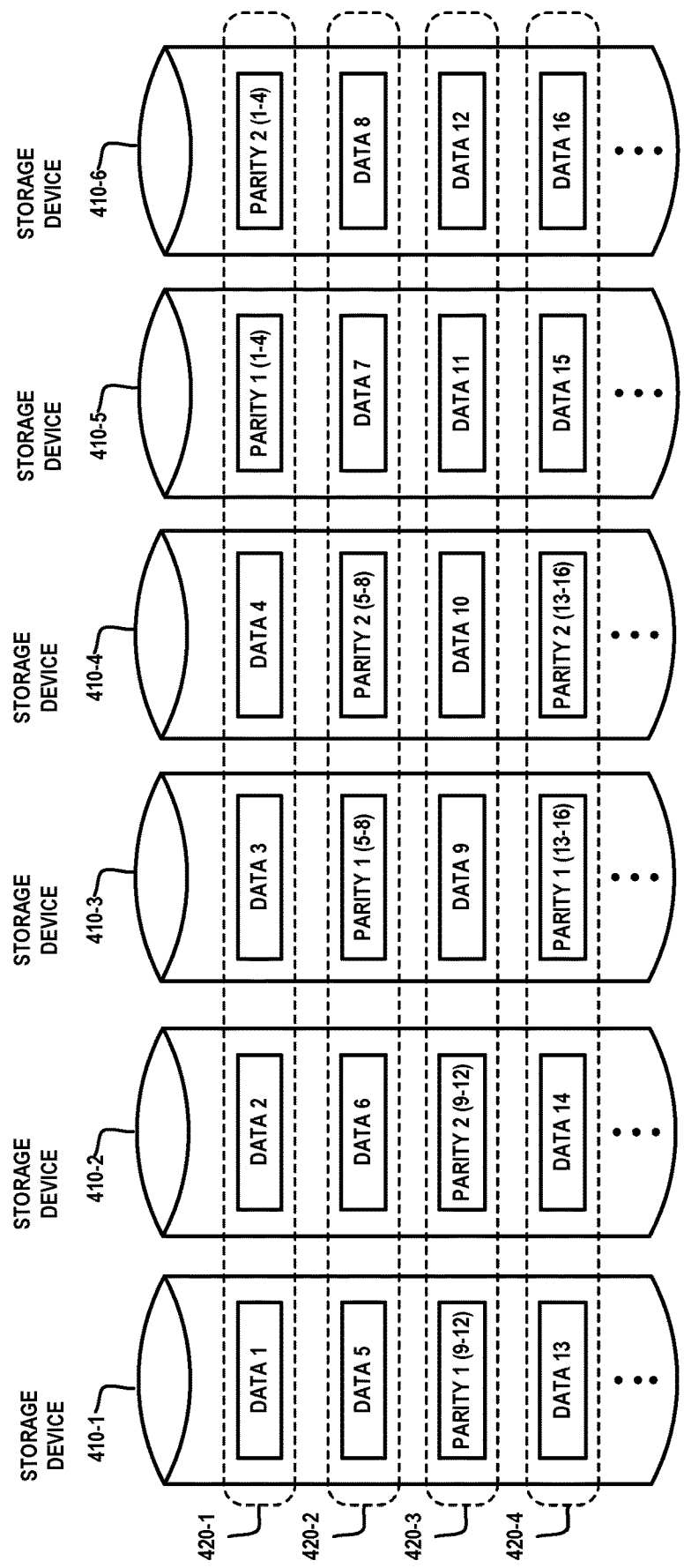
FIG. 4 schematically illustrates a RAID 6 configuration which can be generated and managed by the storage control node of FIG. 2, according to an exemplary embodiment of the disclosure.

FIG. 4 schematically illustrates a RAID 6 configuration which can be generated and managed by RAID control module 240 of the storage control node of FIG. 2, according to an exemplary embodiment of the disclosure. In particular, as shown in FIG. 4, the RAID 6 configuration 400 comprises six storage devices 410-1, 410-2, 410-3, 410-4, 410-5, and 410-6 (collectively, storage devices 410). In some embodiments, in the context of the exemplary system shown in FIG. 1, each storage device 410-1, 410-2, 410-3, 410-4, 410-5, and 410-6 comprises a different storage device (e.g., SSD device) that resides on a different one of the storage nodes 150 of the data storage system 130. The RAID 6 configuration 400 is organized in grids of data blocks, with N rows and K columns, wherein each column is a separate physical storage device (e.g., SSD device) of a different storage node, and wherein 4 data columns are used to store data strips, and two columns are used to store associated parity data strips, e.g., PQ parity data, which is computed using known techniques.

In the exemplary embodiment of FIG. 4, for ease of illustration, four individual RAID 6 stripes 420-1, 420-2, 420-3, and 420-4 are shown, wherein each RAID stripe 420-1, 420-2, 420-3, and 420-4 comprises 4 data strips and 2 parity strips. In particular, the RAID stripe 420-1 comprises four data strips Data 1, Data 2, Data 3, and Data 4, and two independent parity strips Parity 1 (1-4) and Parity 2 (1-4) for the data strips Data 1, Data 2, Data 3, and Data 4. The RAID stripe 420-2 comprises four data strips Data 5, Data 6, Data 7, and Data 8, and two independent parity strips Parity 1 (5-8) and Parity 2 (5-8) for the data strips Data 5, Data 6, Data 7, and Data 8. The RAID stripe 420-3 comprises four data strips Data 9, Data 10, Data 11, and Data 12, and two independent parity strips Parity 1 (9-12) and Parity 2 (9-12) for the data strips Data 9, Data 10, Data 11, and Data 12. The RAID stripe 420-4 comprises four data strips Data 13, Data 14, Data 15, and Data 16, and two independent parity strips Parity 1 (13-16) and Parity 2 (13-16) for the data strips Data 13, Data 14, Data 15, and Data 16.

While FIG. 4 illustrates an exemplary RAID 6 layout for the data strips and associated parity strips, different RAID 6 layout schemes can be implemented which specify different orders and locations in which the constituent data strips and associated parity strips are written to the storage devices 410-1, 410-2, 410-3, 410-4, 410-5, and 410-6 within the RAID 6 configuration 400. The RAID configuration 400 provide resiliency and data protection in the event of a failure of a maximum of two storage devices of the storage devices 410-1, 410-2, 410-3, 410-4, 410-5, and 410-6 which implement the RAID configuration 400.

In some embodiments, in the context of the LSA storage system in which the data is stored in log segments of a log-structured array, each log segment comprises a strip of a given RAID stripe. More specifically, in some embodiments, each log segment comprises a data strip of a given stripe, wherein the stripe includes a plurality of log segments. For example, in some embodiments, each stripe comprises n log segments (data strips) (e.g., n=4), and at least one parity strip which comprises parity data that is generated based on the data of the log segments (data strips) of the stripe. For example, in some embodiments, the parity data for a given stripe is computed using an XOR function, wherein a given parity strip is computed by XORing the data of the log segments (data strips) of the given stripe. For example, in the exemplary RAID 6 configuration shown in FIG. 4, for a log-structured RAID array, the RAID stripe 420-1 comprises four log segments (e.g., data strips Data 1, Data 2, Data 3, and Data 4), and two independent parity strips Parity 1 and Parity 2 that are computed using the data of the four log segments. In this regard, a group of n log segments can be considered a "resiliency unit" wherein each resiliency unit comprises, e.g., one parity segment (for RAID 5), or two parity segments (for RAID 6), etc.

Referring back to FIG. 2, the garbage collection control system 250 is configured to control stripe defragmentation operations that are performed by the storage control node 200. For example, the stripe defragmentation control module 254 is configured to identify stripes (e.g., "victim stripes") that are candidates for garbage collection, e.g., stripes that have stale data (e.g., invalid data, or deleted data). For example, a given stripe in which all the strips have entirely stale data can be selected as a victim stripe. In this instance, the victim stripe can be erased without having to read and write valid data content of the strips of the victim stripe to a new stripe. Further, a given stripe having one or more strips with both stale data and valid data can be selected as a victim stripe. In this instance, the valid data content of the victim stripe will be read, condensed, and combined with additional data (e.g., new I/O write data, valid data of another victim stripe, etc.), and then written to a new (empty) stripe, along with one or more parity strips having parity data that is computed based on the data stored in the new stripe. Once the new stripe is successfully written, the victim stripe can be deleted and reclaimed for reuse.

The garbage collection control system 250 implements techniques for optimizing stripe garbage collection/defragmentation operations. For example, in some embodiments, such optimization techniques are based on the fact that the valid data content of a given stripe is not spread evenly among strips within the given stripe. For example, there can be instances where one or more data strips of a given stripe comprise a relatively large amount of stale data, while one or more data strips of the given stripe comprise predominantly valid data (e.g., a given strip has 90% or more of valid data). In such instances, when a given stripe is selected as a victim stripe for garbage collection/defragmentation, the data validity determination module 252 will determine which data strips, if any, of the victim stripe have completely valid data or substantially valid data (e.g., determine each data strip of the victim stripe which has an amount of valid data content which meets or exceeds a specified validity threshold).

For each data strip of the victim stripe which is deemed to have a relatively large amount of valid data (e.g., a predominantly valid data strip), the stripe defragmentation control module 254 will send a copy command (e.g., copy-offload command) to a device controller which is responsible for managing a storage device which comprises the predominantly valid data strip, so that the predominantly valid data strip of the victim stripe is simply copied and moved by the device controller to another region of the storage device which comprises a data strip of the new stripe that is selected for the garbage collection process. In this regard, the write process is offloaded to the local device controller, which eliminates the need for the garbage collection control system to write such predominantly valid data strip to a remote device over a storage network fabric. In some embodiments, such copy commands are implemented using standard device protocols that support a copy-offload operation including, but not limited to, xCopy (SCSI) or "simple copy" (NVMe).

Figure 5A:
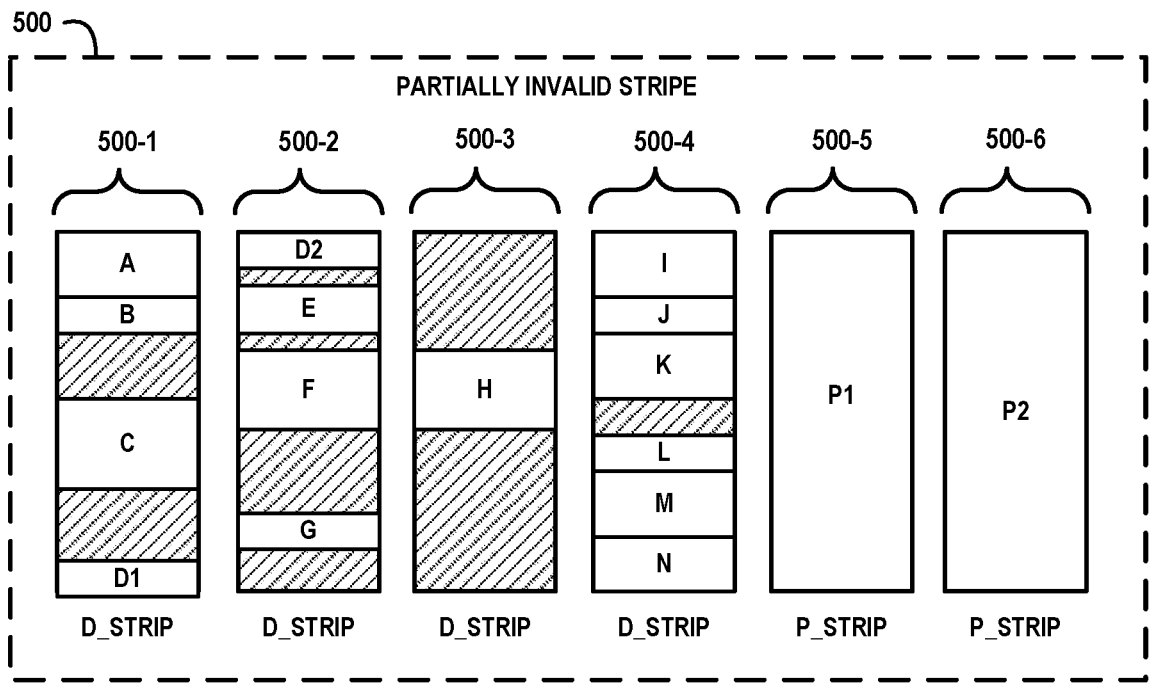
FIGS. 5A and 5B schematically illustrate a method for performing garbage collection, according to an exemplary embodiment of the disclosure.
Figure 5B:
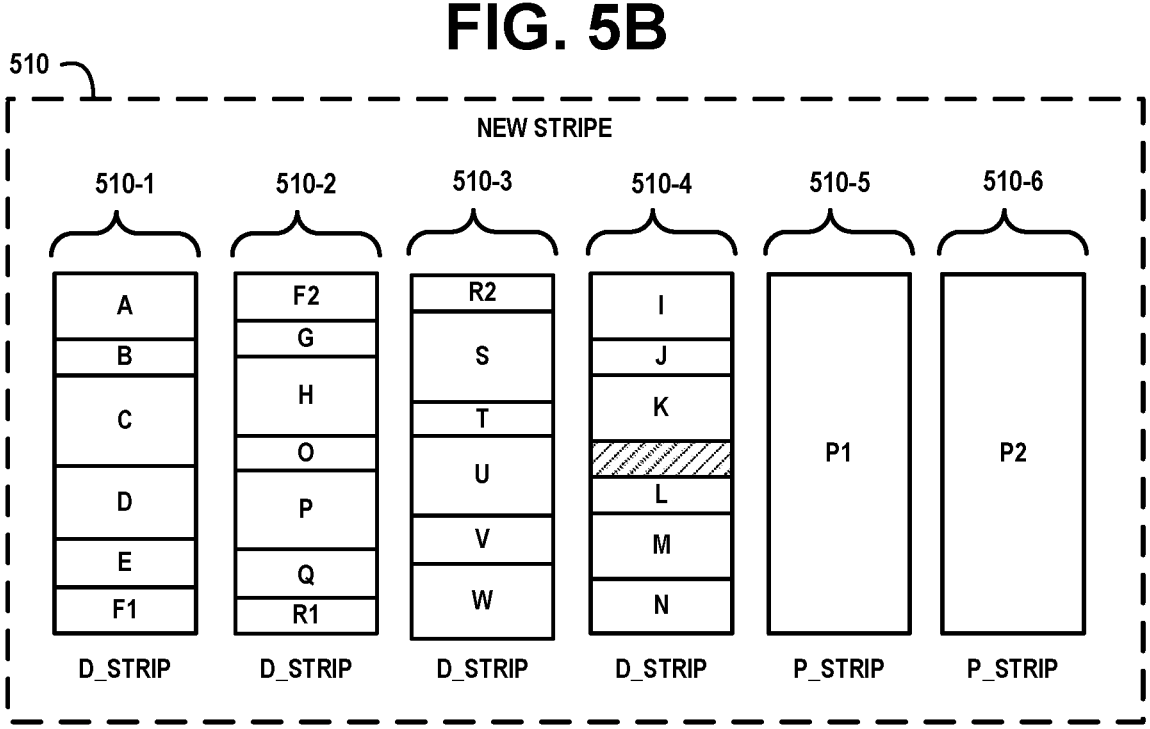

FIGS. 5A and 5B schematically illustrate a method for performing garbage collection, according to an exemplary embodiment of the disclosure. FIG. 5A schematically illustrates a partially invalid stripe 500 (alternatively, victim stripe 500) which comprises six (6) strips 500-1, 500-2, 500-3, 500-4, 500-5, and 500-6. The strips 500-1, 500-2, 500-3, and 500-4 comprises data stripes (D_Strip), and the strips 500-5 and 500-6 comprises first and second parity strips P1 and P2 (P_Strip). In this exemplary illustration, it assumed that the partially invalid stripe 500 is part of RAID 6 storage array, wherein each strip 500-1, 500-2, 500-3, 500-4, 500-5, and 500-6 resides on an independent system component (e.g., different storage devices of different storage nodes).

Furthermore, in some embodiments, it is assumed that each data strip 500-1, 500-2, 500-3, and 500-4 comprises a respective log segment of a log-structured array which is managed by, e.g., the LSA control module 230 (FIG. 2) which is configured to write full stripes to thereby avoid the overhead associated with performing in-place updates within data strips (e.g., log segments) of RAID stripes. In this regard, when a full stripe is initially written, the new stripe will be occupied with 100% (or substantially 100%) valid data. However, over time, as some data of the stripe is re-written to other locations or deleted, the stale data of the stripe will no longer be needed by applications other than the RAID itself for purposes of recovery in the event of a failure. Indeed, the stale data (e.g., invalid data or deleted data) of a given stripe cannot and should not be altered since the RAID encoding must remain consistent for future recovery of one or more lost strips in case of a failure event, using the data of the remaining data and/or parity strips.

FIG. 5A illustrates a given point in time where the stripe 500 is partially invalid as a result of stale data (represented by hatched shading) in each of the data strips 500-1, 500-2, 500-3, and 500-4. In FIG. 5A, the data blocks A, B, C, D (comprised of D1 and D2), E, F, G, H, I, J, K, L, M, and N represent valid data blocks within the data strips. In some embodiments, in a log-structured RAID configuration, each block A, B, C, D, E, F, G, H, I, J, K, L, M, and N represents a log entry comprising a metadata item and a data item (e.g., compressed data item). Furthermore, within each data strip 500-1, 500-2, 500-3, and 500-4, each data block represents an atomic unit of data (e.g., log entry) that will be valid or invalid as a whole. In embodiments where in-line data compression is implemented to compress data that is stored in the log segments, the data blocks (e.g., log entries) will have different sizes, as schematically shown in FIG. 5A. Furthermore, in some embodiments, a given data block may cross a strip boundary and be stored in consecutive/adjacent strips. For example, as shown in FIG. 5A, the data block D is comprised of a first portion D1 which is stored at the end of the first data strip 500-1, and a second portion D2 which is stored at a beginning of the second data strip 500-2. In this instance, the data block D is stored across the boundary of the first and second data strips 500-1 and 500-2.

FIG. 5A depicts an illustrative embodiment in which the data strip 500-4 comprises predominantly valid data (e.g., data blocks I, J, K, L, M, and N have valid data), while the data strips 500-1, 500-2, and 500-3 have a relatively large amount of stale data. In a conventional garbage collection process, each of the data strips 500-1, 500-2, 500-3, and 500-4 of the victim stripe 500 would be read from the respective storage devices and stored in RAM memory of the host storage control node performing the stripe defragmentation operation. The valid data blocks of the data strips 500-1, 500-2, 500-3, and 500-4 would be condensed/compacted and combined with additional data (e.g., new I/O write data, or data of other victim stripes being defragmented, etc.), and then written into a new stripe along with newly computed parity strips. This conventional process involves performing multiple I/O read and write operations over the storage network because all data strips of the victim stripe are read into host memory and then all new data strips of the new stripe are written to the storage devices over different storage nodes. As such, the conventional process can increase the latency of the garbage collection process and increase the storage network traffic.

As an optimization of the garbage collection process, given that the data strip 500-4 comprises predominantly valid data, the data strip 500-4 is not defragmented along with the other data strips data strips 500-1, 500-2, and 500-3. Instead, the data strip 500-4 is read by the host storage control node and stored in RAM memory for purposes of computing parity, but the data strip 500-4 is copied "as is" to a new data strip on the same storage device using a local copy command (e.g., xCopy (for SCSI), "simple copy" (for NVMe), etc.) that is executed by the local device controller of the storage node. In this regard, the process of writing the data strip 500-4 to the new data strip of the new stripe is offloaded to the local device controller of the storage node. Advantageously, the copy-offload operation eliminates the overhead needed for the storage control node to perform an I/O write operation to write the predominantly valid data strip 500-4 to the new strip, and reduces the storage network traffic in instances where the data strip 500-4 is stored in a storage node that is remote from the storage control node performing the stripe defragmentation process.

By way of example, FIG. 5B schematically illustrates a new stripe 510 that is generated after garbage collecting the victim stripe 500 of FIG. 5A. The new stripe 510 comprises four data strips 510-1, 510-2, 510-3, and 510-4, and two parity strips 510-5 and 510-6. In the illustrative embodiment shown in FIG. 5B, the data strips 510-1 and 510-2 of the new stripe 510 include the valid data blocks A, B, C, D, E, F, G, and H of the data strips 500-1, 500-2, and 500-3 of the victim stripe 500, which data blocks are compacted/condensed into the new data strips 510-1 and 510-2. Moreover, FIG. 5B shows that the data block F is split into two data blocks F1 and F2 across the boundary of the new data strips 510-1 and 510-2, and that the data block portions D1 and D2 (in the stripe 500 of FIG. 5A) are joined to form the unsplit data block D in the new data stripe 510-1. Furthermore, the new data strips 510-2 and 510-3 include additional data blocks O, P, Q, R (comprised of R1 and R2), S, T, U, V, and W, which are obtained from, e.g., new I/O writes and/or valid data blocks of one or more additional victim strips being defragmented. The data block R is split into two data blocks R1 and R2 across the boundary of the new data strips 510-2 and 510-3.

As further shown in FIG. 5B, the data strip 510-4 of the new stripe 510 comprises the same content as the data strip of 500-4 of the victim stripe 500. In this instance, as noted above, since the data strip 500-4 comprises predominantly valid data, the data strip 500-4 is not defragmented, but rather, the data strip 500-4 is copied "as is" into the new data stripe 510-4 on the same storage device using a local copy command that is executed by the local device controller. This copy operation eliminates the processing overhead need for defragmenting the content of the predominantly valid data strip 500-4, and eliminates the need to perform an I/O write operation over the storage network to write the new data strip 510-4 to a remote storage device.

In some embodiments, a strip-to-device allocation between the victim stripe 500 and the new stripe 510 is selected such the strips of the new stripe 510 are aligned to the same storage devices as the corresponding strips of the victim strip 500, i.e., the new strips 510-1, 510-2, 510-3, 510-4, 510-5 and 510-6 of the new stripe 510 reside on the same storage devices as the respective strips 500-1, 500-2, 500-3, 500-4, 500-5 and 500-6 of the victim stripe 500. In other embodiments, the strip-to-device allocation can be relaxed to require the same strip-to-device allocation only for the data strips which are deemed to have predominantly valid data. For example, in the exemplary embodiment of FIGS. 5A and 5B, the strip-to-device allocation may only be required such that the data strips 500-4 and 510-4 of the respective victim stripe 500 and the new stripe 510 reside on the same storage device.

In some embodiments, another optimization for the garbage collection process is for the storage control node (which is performing the garbage collection operation) to read only valid data blocks from the data strips of the victim stripe to thereby reduce storage network traffic and bandwidth for I/O read operations. For example, in the exemplary embodiment shown in FIG. 5A, when reading the data strip 500-3 of the victim stripe 500, a reduction in I/O read bandwidth can be achieved by reading only the valid data block H, and ignoring the stale data blocks withing the data strip 500-3. This approach is highly efficient when a given data strip of the victim stripe comprises a single valid data block, or a few contiguous valid data blocks, which would require a single I/O read operation. However, this approach is less efficient in instances where a given data strip of the victim stripe comprises multiple non-contiguous valid data blocks, which would require multiple I/O read operations and thus increased overhead to access only the valid data blocks, as compared to performing a single I/O read operation to read the entire data strip.

Figure 6:
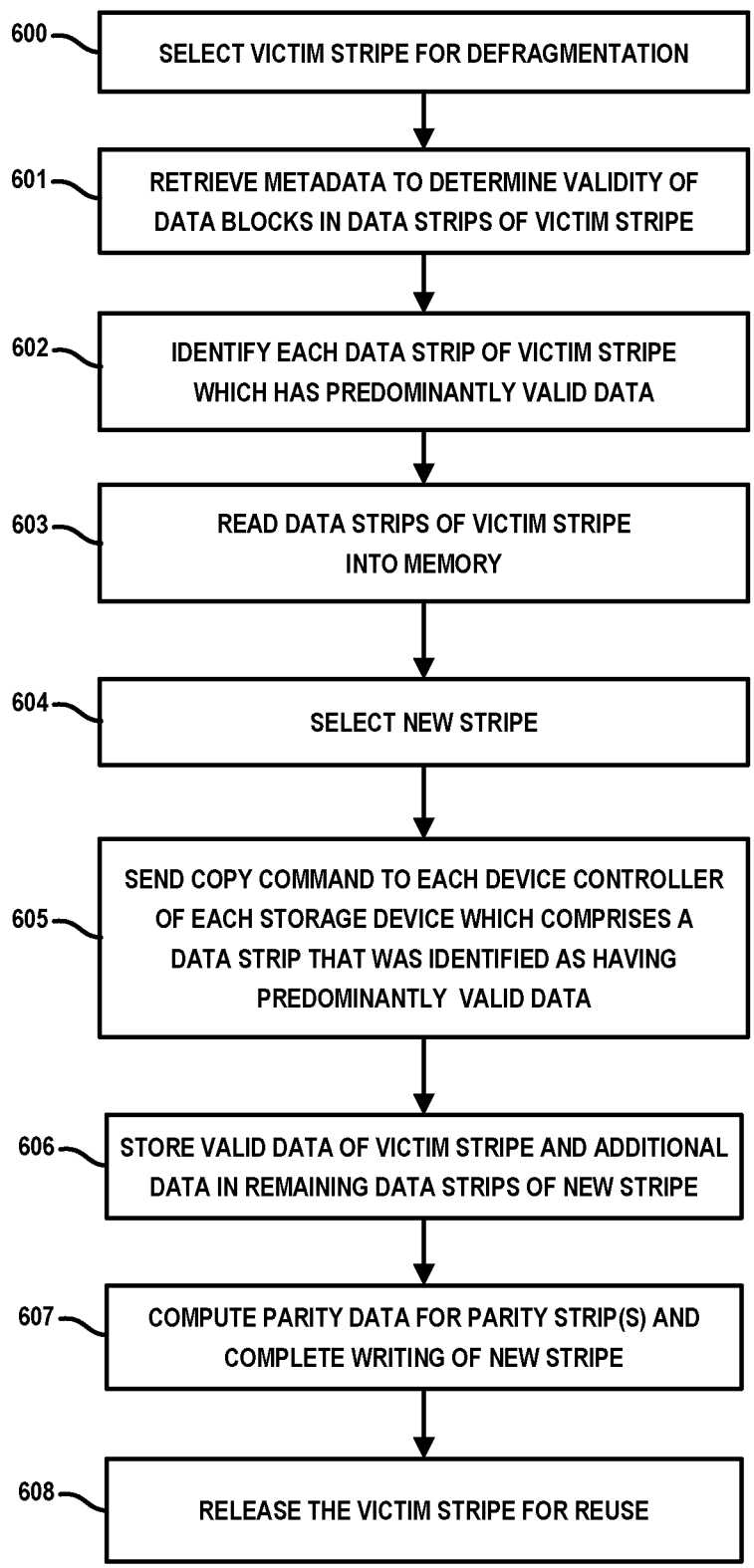
FIG. 6 illustrates a flow diagram of a method for performing garbage collection, according to an exemplary embodiment of the disclosure.

FIG. 6 illustrates a flow diagram of a method for performing garbage collection, according to an exemplary embodiment of the disclosure. For purposes of illustration, the process flow of FIG. 6 will be discussed in the context of the exemplary embodiments shown in FIGS. 1, 5A, and 5B, wherein it is assumed that given storage control node (e.g., storage control node 140-1) is performing the garbage collection operation (via the garbage collection control system 144) to garbage collect/defragment at least one stripe (e.g., victim stripe 500, FIG. 5A). The storage control node will select at least one victim stripe for defragmentation (block 600) and retrieve metadata associated with the victim stripe, which describes the validity of the selected victim stripe. As noted above, the storage control node can utilize any suitable process to select victim stripes for garbage collection (e.g., a stripe having a large amount of stale data).

The storage control node utilizes the retrieved metadata to identify each data strip of the victim stripe which has predominantly valid data (block 602). In some embodiments, the storage control node will identify each data strip having an amount of valid data content which meets or exceeds a specified "data validity" threshold. For example, in some embodiments, a data validity threshold can be specified to be 0.9 (or 90%) such that any data strip having at least 90% of valid data content is determined to have predominantly valid data. In other embodiments, a specified threshold may comprise a "data invalidity" threshold which is used to determine if a given data strip has an amount of invalid data (or stale) data which does not exceed the specified data invalidity threshold. For example, in some embodiments, a data invalidity threshold can be specified to be 0.1 (or 10%) such that any data strip having 10% or less of invalid data is determined to have predominantly valid data. In the exemplary embodiment of FIG. 5A, it is assumed that the data strip 500-4 is determined to have predominantly valid data, and that the data strips 500-1, 500-2, and 500-3 are determined to not have predominantly valid data.

The storage control node reads the data strips of the victim stripe into memory of the server which hosts the storage control node performing the garbage collection process (block 603). For example, the storage control node will issue I/O read requests to the storage nodes having storage devices which store the data strips of the victim stripe. As noted above, in some embodiments, in the striped storage volume, the data and parity strips of each stripe are stored in separate storage nodes. For example, in the exemplary embodiment of FIG. 5A, the data strips 500-1, 500-2, 500-3, and 500-4 are stored in different storage devices of different storage nodes. In some embodiments, each data strip will be read in its entirety, while in other embodiments, only valid data blocks of the data strips will be read to reduce storage network traffic. With this step, the storage control node reads the data strip(s) which are deemed to have predominantly valid data (e.g., data strip 500-4) along with the other data strips for purposes of computing new parity information for a new stripe.

The storage control node will then select a new (empty) stripe that is available to store the valid data blocks of the data strips of the victim stripe along with additional data (block 604). In some embodiments, the storage control node will select an empty stripe that is aligned to the victim stripe (e.g., same strip-to-device allocation). In particular, the storage control node will select an empty stripe having data and parity strips that reside on the same storage devices as the data and parity strips of the victim stripe. In other embodiments, the storage control node can select an empty stripe which at least has data strips that align to those data strips (e.g., strip 500-4, FIG. 5A) of the victim stripe that were deemed to have predominantly valid data, while other strips of the selected new stripe do not need to be aligned to the other strips of the victim stripe.

The storage control node will send a copy command (e.g., copy-offload command) to each device controller of each storage node having a storage device that stores a data strip of the victim stripe that was deemed to have predominantly valid data (block 605). In response to receiving a copy command, the device controller (e.g., SSD controller) will copy the entire predominantly valid data strip (both valid and stale data) of the victim stripe to a target data strip of the new stripe which resides on the same storage device. As noted above, the copy command can be implemented using protocols including, but not limited to, an XCOPY command, or a "simple copy" command (NVMe specification) that allows, e.g., an SSD controller to copy multiple contiguous ranges to a single destination.

For example, with reference to the exemplary embodiments of FIGS. 1, 5A and 5B, assume that the predominantly valid data strip 500-4 of the victim stripe 500 (FIG. 5A) is stored in given storage device of the storage device array 154 of the storage node 150-2 (FIG. 1), and that a target strip of the new stripe 510 (FIG. 5B) resides in the same storage device of the storage device array 154 of the storage node 150-2. The storage control node (e.g., storage control node 140-1, FIG. 1) would issue a copy command to the controller 152 of the storage node 150-2 to copy the entire data strip 500-4 of the victim stripe 500 to the target strip in the same storage device to generate the data strip 510-4 of the new stripe 510. With this process, the entire data strip 500-4 of the victim stripe 500 would be copied to the offset of the target strip 510-4 of the newly selected stripe 510. As noted above, the process of copying the predominantly valid data strip 500-4 to the new data strip 510-4 is offloaded to the local device controller, thereby eliminating the need of the storage control node to perform an I/O write operation over the storage network to write the predominantly valid data strip 500-4 to the new data strip 510-4 of the new stripe 510.

The storage control node will proceed to store the valid data blocks of the victim stripe, along with additional data (e.g., data from new I/O writes, valid data of other victim stripes, etc.), into the remaining data strips of the new stripe (block 606). As noted above, in some embodiments, this process involves compacting the valid data blocks of the victim stripe into one or more data strips of the new stripe, and then filling the remaining capacity of the remaining data strips of the new stripe with additional data. There can be instances where some of the valid data blocks of the victim stripe are stored across the boundary of two adjacent strips, and these valid data blocks can be handled differently in different situations.

For example, as shown in FIGS. 5A and 5B, the data block D is split into two data blocks D1 and D2 that are initially stored across the adjacent data strips 500-1 and 500-2 of the victim stripe 500. When both data strips 500-1 and 500-2 of the victim stripe 500 are determined to not have predominantly valid data, both data strips 500-1 and 500-2 will be defragmented, and the two separate data blocks D1 and D2 can be combined such that the entire data block D is stored in a single data strip 510-1 of the new stripe 510, as shown in FIG. 5B. On the other hand, if a given data block is split across the boundary of two adjacent data strips of the victim stripe, and only one of the data strips of the victim stripe is deemed to have predominantly valid data, then both data strips of the victim stripe will be garbage collected using the standard garbage collection process notwithstanding that one of the data strips has predominantly valid data. For example, in the exemplary embodiment of FIG. 5A, if only one of the data strips 500-1 and 500-2 of the victim stripe 500 was determined to have predominantly valid data, then both data strips 500-1 and 500-2 of the victim stripe 500 would be garbage collected and defragmented since the valid data block D is split across the boundary of the two adjacent data strips 500-1 and 500-2 of the victim stripe 500.

In some embodiments, the stale data portion(s) of a predominantly valid data block can be filled with additional valid data following the copy-offload operation. For example, with regard to the data strip 510-4 of the new stripe 510 shown in FIG. 5B, a valid data block (e.g., a data block of new I/O write, or a valid data block of another victim stripe, etc.) can be written to the region between the data blocks K and L, assuming the valid data block fits into such region, following the copy-offload of the predominantly valid data strip 500-4 to the new data strip 510-4.

Once the data strips of the newly selected stripe are filled with valid data, the storage control node will compute parity information for the new stripe, and complete the writing of the new stripe by writing the parity information to one or more parity strips of the new stripe (block 607). Once the data and parity strips of the new stripe are successfully written to the target storage devices of the striped storage volume, the victim stripe is released for reuse (block 608).

As noted above, exemplary embodiments of the disclosure provide techniques for optimizing garbage collections operations in, e.g., a striped storage volume. The garbage collection techniques provide optimization with regard to, e.g., reducing storage network traffic, reducing CPU cache utilization, and reducing a number of I/O operations needed to perform garbage collection operations. The exemplary garbage collection techniques disclose herein provide significant savings in many use cases including high-capacity utilization and large cold writes.

Figure 7:
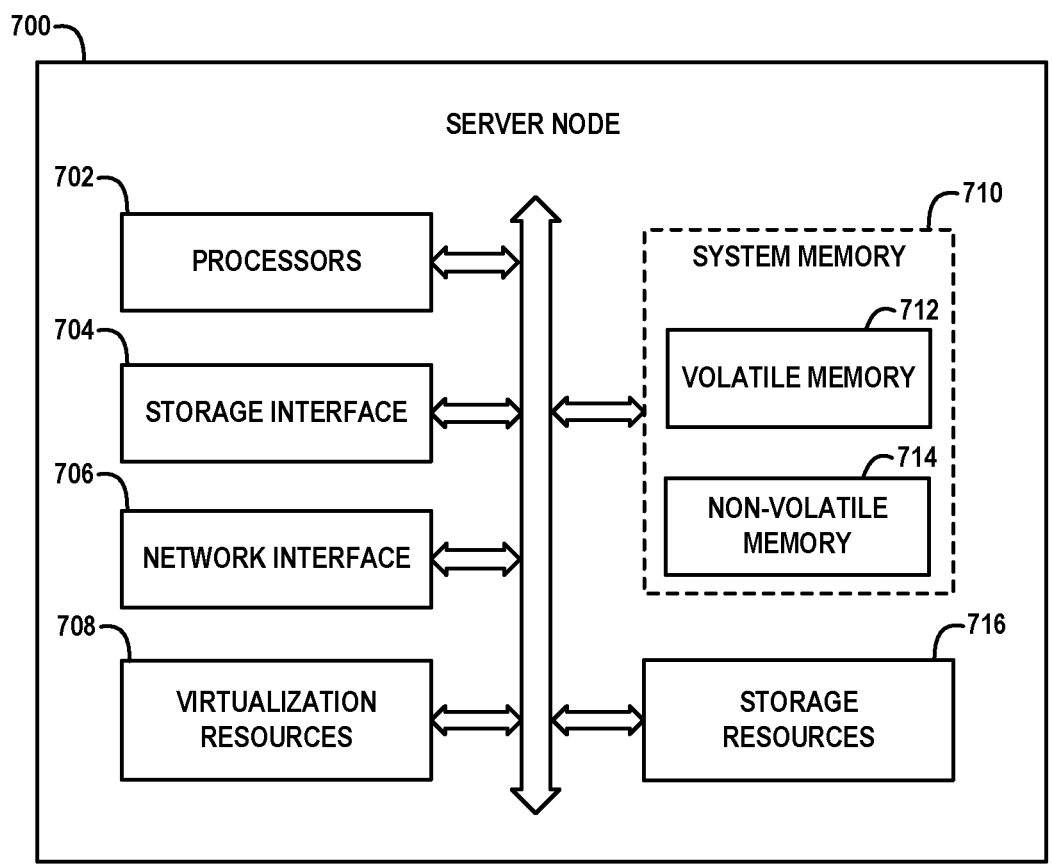
FIG. 7 schematically illustrates a framework of a server for hosting a storage control node, according to an exemplary embodiment of the disclosure.

FIG. 7 schematically illustrates a framework of a server node 700 for hosting a storage control node, according to an exemplary embodiment of the disclosure. The server node 700 comprises processors 702, storage interface circuitry 704, network interface circuitry 706, virtualization resources 708, system memory 710, and storage resources 716. The system memory 710 comprises volatile memory 712 and non-volatile memory 714. The processors 702 comprise one or more types of hardware processors that are configured to process program instructions and data to execute a native operating system (OS) and applications that run on the server node 700.

For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities of storage control nodes and associated garbage collection control systems as discussed herein. In some embodiments, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well execute one or more of the various modules and functionalities of a storage control node and a garbage collection control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage control nodes and garbage collection control systems (as shown in FIGS. 1 and 2) and the garbage collection processes discussed herein (e.g., FIGS. 5A, 5B, and 6) are implemented using program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile system memory 712 is configured as the highest-level memory tier, and the non-volatile system memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
performing a garbage collection process in a data storage system, wherein the data storage system comprises a storage control node and a plurality of storage nodes, wherein the storage nodes are configured to implement a striped volume comprising a plurality of stripes which have strips that are distributed over the plurality of storage nodes, wherein the garbage collection process comprises:
selecting, by the storage control node, at least one stripe of the plurality of stripes of the striped volume, as a victim stripe for garbage collection;
selecting, by the storage control node, at least one empty stripe of the striped volume;
selecting, by the storage control node, a data strip of the victim stripe, which is determined to have an amount of valid data content which at least one of meets and exceeds a specified data validity threshold;
sending, by the storage control node, a copy command to a target storage node of the plurality of storage nodes, which comprises the selected data strip of the victim stripe, to thereby cause the target storage node to copy the selected data strip to a data strip of the selected empty stripe which resides on the target storage node;
writing, by the storage control node, valid data blocks of the victim stripe to remaining data strips of the selected empty stripe to thereby generate a new stripe populated with valid data; and
releasing, by the storage control node, the victim stripe for reuse.

2. The method of claim 1, wherein the striped volume comprises one of a RAID (Redundant Array of Independent Drives) array, and a log-structured RAID array.

3. The method of claim 1, wherein selecting at least one empty stripe of the striped volume comprises selecting an empty stripe having strips that reside on a same set of storage nodes which contain the strips of the victim stripe.

4. The method of claim 1, wherein writing valid data blocks of the victim stripe to remaining data strips of the selected empty stripe to thereby generate a new stripe populated with valid data, comprises:
condensing the valid data blocks of the victim stripe into one or more data stripes of the selected empty stripe; and
writing additional data to the remaining data strips of the empty stripe.

5. The method of claim 4, wherein writing additional data to the remaining data strips of the empty stripe comprises writing at least one of (i) new data of received input/output (I/O) write requests and (ii) valid data of at least one other victim stripe, to the remaining data strips of the empty stripe to write a full stripe.

6. The method of claim 1, further comprising:
computing, by the storage control node, parity information based on the valid data of the new stripe; and
writing, by the storage control node, at least one parity strip of the new stripe to include the computed parity information.

7. The method of claim 1, wherein selecting a data strip of the victim stripe, which is determined to have an amount of valid data content which at least one of meets and exceeds a specified data validity threshold, comprises selecting, by the storage control node, each data strip of the victim stripe having an amount of valid data content which at least one of meets and exceeds the specified data validity threshold.

8. The method of claim 1, wherein the specified data validity threshold is no less than about 0.9.

9. An article of manufacture comprising a non-transitory processor-readable storage medium having stored therein program code of one or more software programs, wherein the program code is executable by one or more processors to implement a method which comprises:
performing a garbage collection process in a data storage system, wherein the data storage system comprises a storage control node and a plurality of storage nodes, wherein the storage nodes are configured to implement a striped volume comprising a plurality of stripes which have strips that are distributed over the plurality of storage nodes, wherein the garbage collection process comprises:
selecting, by the storage control node, at least one stripe of the plurality of stripes of the striped volume, as a victim stripe for garbage collection;
selecting, by the storage control node, at least one empty stripe of the striped volume;
selecting, by the storage control node, a data strip of the victim stripe, which is determined to have an amount of valid data content which at least one of meets and exceeds a specified data validity threshold;
sending, by the storage control node, a copy command to a target storage node of the plurality of storage nodes, which comprises the selected data strip of the victim stripe, to thereby cause the target storage node to copy the selected data strip with predominantly valid data to a data strip of the selected empty stripe which resides on the target storage node;
writing, by the storage control node, valid data blocks of the victim stripe to remaining data strips of the selected empty stripe to thereby generate a new stripe populated with valid data; and
releasing, by the storage control node, the victim stripe for reuse.

10. The article of manufacture of claim 9, wherein the striped volume comprises one of a RAID (Redundant Array of Independent Drives) array, and a log-structured RAID array.

11. The article of manufacture of claim 9, wherein the program code for selecting at least one empty stripe of the striped volume comprises program conde for selecting an empty stripe having strips that reside on a same set of storage nodes which contain the strips of the victim stripe.

12. The article of manufacture of claim 9, wherein the program code for writing valid data blocks of the victim stripe to remaining data strips of the selected empty stripe to thereby generate a new stripe populated with valid data, comprises:
program code for condensing the valid data blocks of the victim stripe into one or more data stripes of the selected empty stripe; and
program code for writing additional data to the remaining data strips of the empty stripe.

13. The article of manufacture of claim 12, wherein the program code for writing additional data to the remaining data strips of the empty stripe comprises program code for writing at least one of (i) new data of received input/output (I/O) write requests and (ii) valid data of at least one other victim stripe, to the remaining data strips of the empty stripe to write a full stripe.

14. The article of manufacture of claim 9, further comprising program code which is executable by the one or more processors to implement a method which comprises:

computing, by the storage control node, parity information based on the valid data of the new stripe; and writing, by the storage control node, at least one parity strip of the new stripe to include the computed parity information.

15. The article of manufacture of claim 9, wherein the program code for selecting a data strip of the victim stripe, which is determined to have an amount of valid data content which at least one of meets and exceeds a specified data validity threshold, comprises program code for selecting, by the storage control node, each data strip of the victim stripe having an amount of valid data content which at least one of meets and exceeds the specified data validity threshold.

16. A system, comprising:

a storage control node, and a plurality of storage nodes, wherein the storage nodes are configured to implement a striped volume comprising a plurality of stripes which have strips that are distributed over the plurality of storage nodes;

wherein the storage control node is configured to perform a garbage collection process, in which the storage control node is configured to:

select at least one stripe of the plurality of stripes of the striped volume, as a victim stripe for garbage collection;

select at least one empty stripe of the striped volume;

select a data strip of the victim stripe, which is determined to have an amount of valid data content which at least one of meets and exceeds a specified data validity threshold;

send a copy command to a target storage node of the plurality of storage nodes, which comprises the selected data strip of the victim stripe, to thereby cause the target storage node to copy the selected data strip to a data strip of the selected empty stripe which resides on the target storage node;

write valid data blocks of the victim stripe to remaining data strips of the selected empty stripe to thereby generate a new stripe populated with valid data; and release the victim stripe for reuse.

17. The system of claim 16, wherein the striped volume comprises one of a RAID (Redundant Array of Independent Drives) array, and a log-structured RAID array.

18. The system of claim 16, wherein in selecting at least one empty stripe of the striped volume, the storage control node is configured to select an empty stripe having strips that reside on a same set of storage nodes which contain the strips of the victim stripe.

19. The system of claim 16, wherein in writing valid data blocks of the victim stripe to remaining data strips of the selected empty stripe to thereby generate a new stripe populated with valid data, the storage control node is configured to:

condense the valid data blocks of the victim stripe into one or more data stripes of the selected empty stripe; and write additional data to the remaining data strips of the empty stripe by writing at least one of (i) new data of received input/output (I/O) write requests and (ii) valid data of at least one other victim stripe, to the remaining data strips of the empty stripe to write a full stripe.

20. The system of claim 16, wherein in selecting a data strip of the victim stripe, which is determined to have an amount of valid data content which at least one of meets and exceeds a specified data validity threshold, the storage control node is configured to select each data strip of the victim stripe having an amount of valid data content which at least one of meets and exceeds the specified data validity threshold.

\* \* \* \* \*